United States Patent
James et al.

(10) Patent No.: US 8,041,023 B1
(45) Date of Patent: Oct. 18, 2011

(54) SYSTEM AND METHOD OF USING A PHONE TO ACCESS INFORMATION IN A CALL CENTER

(75) Inventors: Eric James, Elgin, IL (US); David Funck, Wheaton, IL (US)

(73) Assignee: Aspect Software, Inc., Lombard, IL (US)

( * ) Notice: Subject to any disclaimer, the term of this patent is extended or adjusted under 35 U.S.C. 154(b) by 910 days.

(21) Appl. No.: 09/675,597

(22) Filed: Sep. 29, 2000

(51) Int. Cl.
*H04M 3/00* (2006.01)
*H04M 1/24* (2006.01)

(52) U.S. Cl. .................. 379/265.03; 379/32.01
(58) Field of Classification Search .............. 379/88.13, 379/88.16, 88.17, 88.22–88.25, 219–265.03, 379/265.09, 266.01, 266.1
See application file for complete search history.

(56) References Cited

U.S. PATENT DOCUMENTS

| | | | |
|---|---|---|---|
| 5,452,341 A * | 9/1995 | Sattar | 379/88.27 |
| 5,479,487 A * | 12/1995 | Hammond | 379/88.22 |
| 5,555,179 A | 9/1996 | Koyama et al. | |
| 5,572,570 A | 11/1996 | Kuenzig | |
| 5,586,179 A * | 12/1996 | Stent et al. | 379/265.11 |
| 5,592,538 A | 1/1997 | Kosowsky et al. | |
| 5,623,540 A * | 4/1997 | Morrison et al. | 379/112.01 |
| 5,633,924 A * | 5/1997 | Kaish et al. | 379/266.03 |
| 5,675,637 A * | 10/1997 | Szlam et al. | 379/142.17 |
| 5,765,033 A | 6/1998 | Miloslavsky | |
| 5,790,650 A * | 8/1998 | Dunn et al. | 379/265.03 |
| 5,802,526 A | 9/1998 | Fawcett et al. | |
| 5,822,727 A | 10/1998 | Garberg et al. | |
| 5,825,869 A * | 10/1998 | Brooks et al. | 379/265.12 |
| 5,828,747 A * | 10/1998 | Fisher et al. | 379/265.12 |
| 5,832,059 A * | 11/1998 | Aldred et al. | 379/32.01 |
| 5,867,562 A * | 2/1999 | Scherer | 379/88.21 |
| 5,870,464 A * | 2/1999 | Brewster et al. | 379/219 |
| 5,903,641 A * | 5/1999 | Tonisson | 379/265.12 |
| 5,926,539 A | 7/1999 | Shtivelman | |
| 5,943,416 A * | 8/1999 | Gisby | 379/265.13 |
| 5,946,387 A | 8/1999 | Miloslavsky | |
| 5,953,332 A | 9/1999 | Miloslavsky | |
| 5,953,405 A | 9/1999 | Miloslavsky | |
| 5,963,635 A * | 10/1999 | Szlam et al. | 379/309 |
| 5,970,065 A * | 10/1999 | Miloslavsky | 370/352 |
| 5,974,135 A * | 10/1999 | Breneman et al. | 379/265.04 |
| 6,002,760 A | 12/1999 | Gisby | |
| 6,021,428 A | 2/2000 | Miloslavsky | |

(Continued)

FOREIGN PATENT DOCUMENTS

DE 198 44 223 5/2000

(Continued)

OTHER PUBLICATIONS

"Call Center Command Server Definition", Analysis and High Level Design, Rockwell Electronic Commerce, Aug. 12, 1998, 44 pgs.

*Primary Examiner* — Joseph T Phan
(74) *Attorney, Agent, or Firm* — Husch Blackwell LLP (57) ABSTRACT

A system and method of using voice to access information in a call center is disclosed. Providing a voice response server to handle requests from local and remote administrators allows a call center to be managed even when administrators are physically distant from the call center. The voice response server may adhere to VoiceXML to process requests for call center information from administrators.

26 Claims, 5 Drawing Sheets

U.S. PATENT DOCUMENTS

| | | | |
|---|---|---|---|
| 6,044,142 A * | 3/2000 | Hammarstrom et al. | 379/223 |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,587,556 B1 * | 7/2003 | Judkins et al. | 379/219 |
| 6,604,084 B1 * | 8/2003 | Powers et al. | 705/11 |
| 6,661,886 B1 * | 12/2003 | Huart et al. | 379/215.01 |
| 6,662,163 B1 * | 12/2003 | Albayrak et al. | 704/275 |
| 6,697,858 B1 * | 2/2004 | Ezerzer et al. | 709/224 |
| 6,732,156 B2 | 5/2004 | Miloslavsky | |
| 6,807,574 B1 * | 10/2004 | Partovi et al. | 709/224 |
| 6,859,776 B1 * | 2/2005 | Cohen et al. | 704/270 |
| 6,970,915 B1 * | 11/2005 | Partovi et al. | 709/217 |
| 7,072,966 B1 * | 7/2006 | Benjamin et al. | 709/228 |
| 7,076,041 B2 * | 7/2006 | Brown et al. | 379/142.05 |
| 7,092,508 B2 * | 8/2006 | Brown et al. | 379/265.06 |
| 7,093,264 B2 * | 8/2006 | Choi et al. | 719/316 |
| 7,197,130 B2 * | 3/2007 | Paden et al. | 379/265.02 |
| 7,242,751 B2 * | 7/2007 | Bushey et al. | 379/88.03 |
| 7,281,218 B1 * | 10/2007 | Runge et al. | 715/769 |
| 7,286,661 B1 * | 10/2007 | Balk et al. | 379/265.01 |
| 7,308,093 B2 * | 12/2007 | Annadata et al. | 379/265.12 |
| 7,315,616 B2 * | 1/2008 | Annadata et al. | 379/266.01 |
| 7,321,298 B2 * | 1/2008 | Judkins et al. | 340/506 |
| 7,356,475 B2 * | 4/2008 | Novack et al. | 704/275 |
| 7,450,698 B2 * | 11/2008 | Bushey et al. | 379/88.14 |
| 7,460,652 B2 * | 12/2008 | Chang | 379/88.18 |
| 7,461,342 B2 * | 12/2008 | McLean | 715/704 |
| 7,580,837 B2 * | 8/2009 | Bushey et al. | 704/244 |
| 7,581,230 B2 * | 8/2009 | Chen et al. | 719/328 |
| 7,593,515 B2 * | 9/2009 | Balk et al. | 379/93.24 |
| 7,593,962 B2 * | 9/2009 | Beale et al. | 1/1 |
| 7,596,217 B2 * | 9/2009 | Balk et al. | 379/212.01 |
| 7,596,504 B2 * | 9/2009 | Hughes et al. | 705/9 |
| 7,602,898 B2 * | 10/2009 | Klein et al. | 379/265.01 |
| 7,627,096 B2 * | 12/2009 | Bushey et al. | 379/88.03 |
| 7,627,109 B2 * | 12/2009 | Mitra | 379/265.01 |
| 7,636,432 B2 * | 12/2009 | Bushey et al. | 379/265.02 |
| 7,657,005 B2 * | 2/2010 | Chang | 379/88.02 |
| 7,668,889 B2 * | 2/2010 | Edwards et al. | 707/766 |
| 7,673,241 B2 * | 3/2010 | Sun et al. | 715/729 |
| 2002/0010584 A1 * | 1/2002 | Schultz et al. | 704/270 |
| 2002/0035474 A1 * | 3/2002 | Alpdemir | 704/270 |
| 2002/0046030 A1 * | 4/2002 | Haritsa et al. | 704/256 |
| 2002/0054090 A1 * | 5/2002 | Silva et al. | 345/747 |
| 2003/0076941 A1 * | 4/2003 | Tiliks et al. | 379/196 |
| 2003/0115353 A1 * | 6/2003 | Deryugin et al. | 709/231 |

FOREIGN PATENT DOCUMENTS

| | | |
|---|---|---|
| DE | 199 01 137 | 7/2000 |
| DK | EP0903921 A2 * | 3/1999 |
| EP | 0 735 736 | 10/1996 |
| EP | 0 903 921 | 3/1999 |
| EP | 903921 A2 * | 3/1999 |
| WO | WO 99/45691 | 9/1999 |

* cited by examiner

SYSTEM AND METHOD OF USING A PHONE TO ACCESS INFORMATION IN A CALL CENTER

FIELD OF THE INVENTION

This invention relates to communications systems and, more particularly, to administration of call centers using voice access.

BACKGROUND OF THE INVENTION

Call centers are typically used as a means of distributing customer contacts such as facsimiles, e-mails, video, internet voice, telephone calls, etc. among a group of call center agents of an organization. As customer contacts are directed to the organization from the public switched telephone network (PSTN) or other communication networks, an automatic call distributor (ACD) directs the customer contacts to its call center agents based upon some algorithm. For example, the ACD may recognize a telephone call target based upon an identity of an incoming trunk line and route the call accordingly.

Call center administrators manage and ensure the proper performance of the call center. To manage the call center efficiently, it is important for the call center administrator to have access to the call center wherever the administrator is. For example, if the administrator is called away to another building, it is important for the administrator to be able to check the performance, configuration and attributes of the call center while the administrator is away. Further, administrators who must travel are often away from the call center that they manage and thus require access to the call center to determine whether the call center is properly functioning.

Currently, an administrator who is away from the call center has two options: 1) call a person who is in charge and ask that person for a status of the call center or 2) dial in to the call center by using a portable computer and checking the status of the call center.

The first solution requires that the administrator depend upon another person to get required information. This solution may not be optimal if the person answering the telephone call is not well skilled or trustworthy. The second solution is also not optimal, as it requires the companies that use call centers to purchase a portable computer and modem for every administrator in the company. In a large company with many call centers, this solution requires many portable computers. Further, the administrator must be able to locate a telephone line for which the administrator may be able to dial up to connect to the call center. Finding a telephone line to which the administrator may connect the portable computer may be difficult if the administrator is in a location that does not have such access, such as travelling in a car. Further, this solution requires the company to install the appropriate number of dial up lines so that administrators are not disconnected or put on hold because the dial up lines are unavailable. Both solutions are less than optimal. As a consequence, the performance of the call center may degrade or be impaired when an administrator is away.

Accordingly, a need exists for a better way of allowing the call center administrator to access the call center when the administrator is physically remote from the call center.

SUMMARY

The present invention, accordingly, provides a system and method of using a phone to provide call center administrators access to information in a call center that overcomes or reduces the disadvantageous and limitations associated with prior methods and systems. Illustrated embodiments reduce the disadvantage of not having access to a call center when physically distant from the call center.

BRIEF DESCRIPTION OF THE DRAWINGS

The foregoing advantageous features of the invention will be explained in greater detail and others will be made apparent from the detailed description of the preferred embodiment of the present invention which is given with reference to the several figures of the drawing, in which.

DETAILED DESCRIPTION

Figure 1:
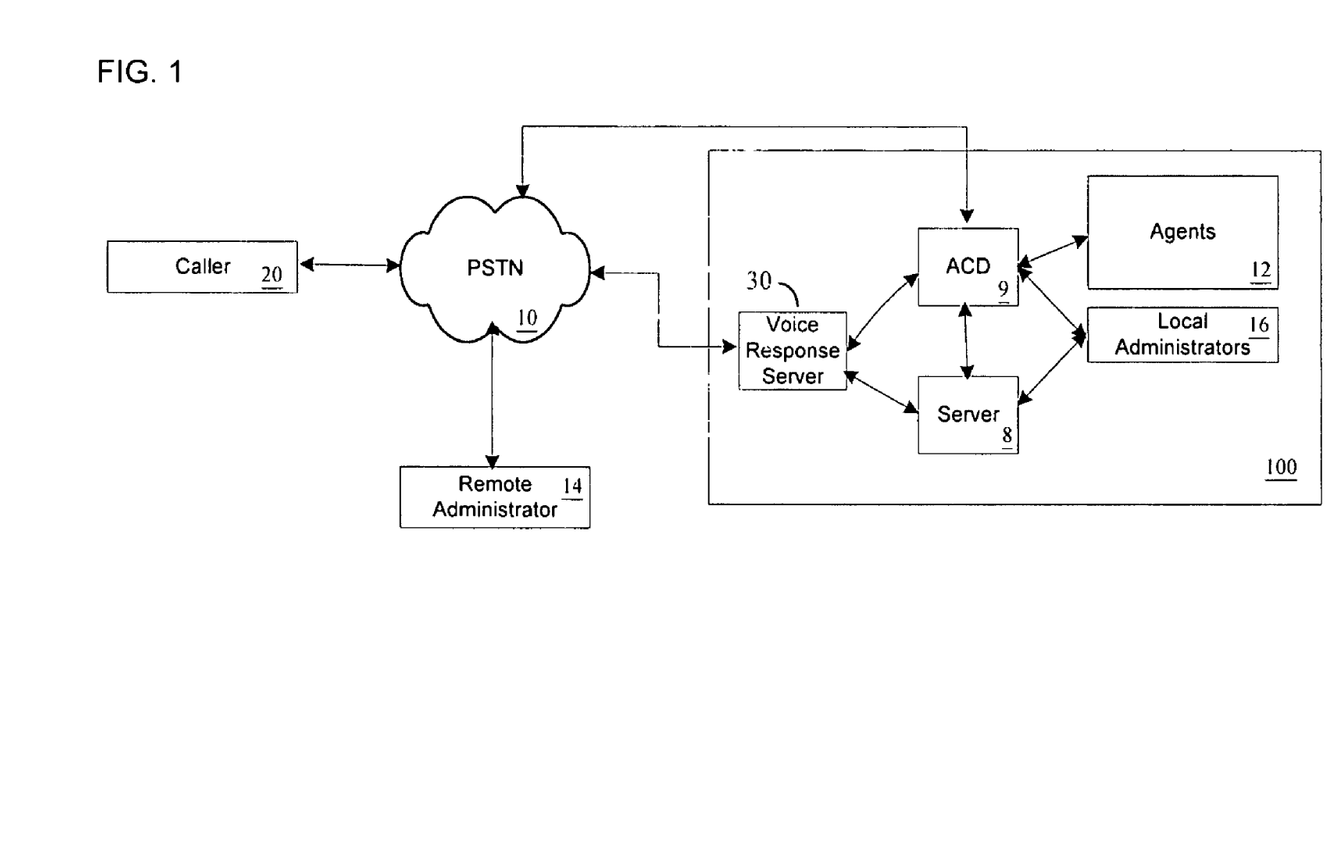
FIG. 1 illustrates a simplified functional block diagram of a call center in accordance with an illustrated embodiment of the invention.

Shown in FIG. 1 is a call center 100 shown in a context of use. The call center 100 includes a number of agents 12, administrators (14, 16), an automatic call distributor 9, a call center command server (3CS) 8, and a voice response server 30. The call center 100 functions to selectively and automatically interconnect customer contacts such as a caller 20 calling through the public switched telephone network (PSTN) 10 to one of the agents 12 in the call center 100. Although the call center 100 is described with reference to an automatic call distributor (ACD), a PBX or centrex system may also be used in place of the ACD. Further, implementing a call center with any of these switching systems is considered to be equivalent and variations will not be discussed further. For a more detailed discussion of automatic call distributors, reference may be made to U.S. Pat. No. 5,268,903 to Jones et al. entitled "Multichannel Telephonic Switching Network With Different Signaling Formats and Connect/PBX Treatment Selectable For Each Channel", issued Dec. 7, 1993; U.S. Pat. No. 5,140,611 to Jones et al. entitled "Pulse Modulated Self-Clocking and Self-Synchronizing Data Transmission and Method for a Telephonic Communication Switching System", issued Aug. 8, 1992 and U.S. Pat. No. 5,127,004 to Lenihan et al. entitled "Tone and Announcement Message Code Generator for a Telephonic Switching System and Method", issued Jun. 30, 1992 which are hereby incorporated by reference.

Further, although the present invention is described in reference to the PSTN 10, a packet-switched voice network or other equivalent network where customer contacts are relayed to a call center 100 may be used. For example, where voice calls are transmitted over a global network, such as the Internet using Internet Protocol (IP) a packet-switched communications network may be used to implement the system of transmitting the call.

In addition to the agents 12, the call center also includes administrators 14, 16. Local administrators 14 are people who are responsible for the management of the call center and are physically at the call center 100. Remote administrators are also responsible for the management of the call center 100 but are not physically at the call center 100. The administrators' 14, 16 responsibilities include, for example, configuring and monitoring call center entities, viewing call center statistics, editing telephony files, and activating call center schedules. In an exemplary embodiment, the call center information that is managed by administrators 14, 16 is summarized in the following table.

| Staff | Automatic Number Identification | Message Display Unit |
|---|---|---|
| Agent Schedule | Identification | Real-Time Display |
| Schedule Adherence | Trunk Group | Display Message |
| Threshold Groups | Route Class | Command |
| Night/Day | Route | Activate Announcement |
| Service/Center | Route List/Route | Command |
| Open/Close | List Entry | Delayed or Scheduled |
| Override | Network Number | Change Activation |
| Application Vector | Announcement | Retrieve Directory |
| Agent Group | Receiver Group | Numbers |
| Agent Information Group | Function Type | Custom Timing Profile |
| | Intercept (Class) | Digital Signal |
| Class of Service | Table | Processing Type |
| Speed Code | Call by Call Service | Digital Audio Service |
| Transaction Code | Table | Type |
| Application | Permanent & NSC Port | Equipment |
| Application Detailed Schedule | Table/Device/T0/T0T/ Trunk Group Member | Serial Data Port T1 |
| Message Queue | Automatic Call | Devices T0/T0T/TGM |
| Security User System/System Model/Header | Handlers - VRU, Fax, and Voice Mail Objects | Configuration Retrieve Events Copy Memory |
| Dialed Number Identification Service | Telescripts and Telescript Versions Application Overflow Statistics Alarm | Voice Mail |

The call center 100 includes a voice response server 30 that functions to provide access to the call center information summarized above. The voice response server 30 accepts an administrator's input such as character, audio and speech and retrieves the information from the call center. As shown in the example of FIG. 4, the voice response server 30 includes a call manager 32, VXML interpreter 36, and network interface 38.

The call manager 32 functions to interface with either a local or remote administrator 14, 16. The call manager 32 accepts character, audio, and speech input from the administrators 14, 16 to perform call connection services and process speech. Further, the call manager performs text to speech translation and automatic speech recognition processing. The call manager 32 accepts character input that includes dual-tone multi-frequency (DTMF) and speech information. In response to a administrator's input, the voice response server 30 outputs call center 100 information to the administrator (14 or 16). The output from the voice response server 30 to an administrator 14, 16 may also be character, audio and speech, such as synthesized speech and digitized audio. The call manager 32 may perform text to speech translation to aurally output information to administrators 14, 16. For example, an administrator (14 or 16) may speak a request to hear the call log. The call manager 32 accepts the speech command and performs speech recognition on the speech input to translate the request into a command to be executed in the call center computers. Once the call log information is retrieved from the call center, the call manager 32 performs text to speech translation to aurally give the call log information to the administrator.

In an illustrative embodiment, the call manager 32 includes speech recognition software such as IBM's ViaVoice. Speech recognition software is used to perform translation of the input speech so that the voice response server may understand the requested command. Any alternative speech recognition software suitable for recognizing the speech of administrators 14, 16 may also be used. The call manager also includes speech synthesis software to perform translation of text into speech. Any suitable speech recognition software may be used to perform this function.

Figure 4:
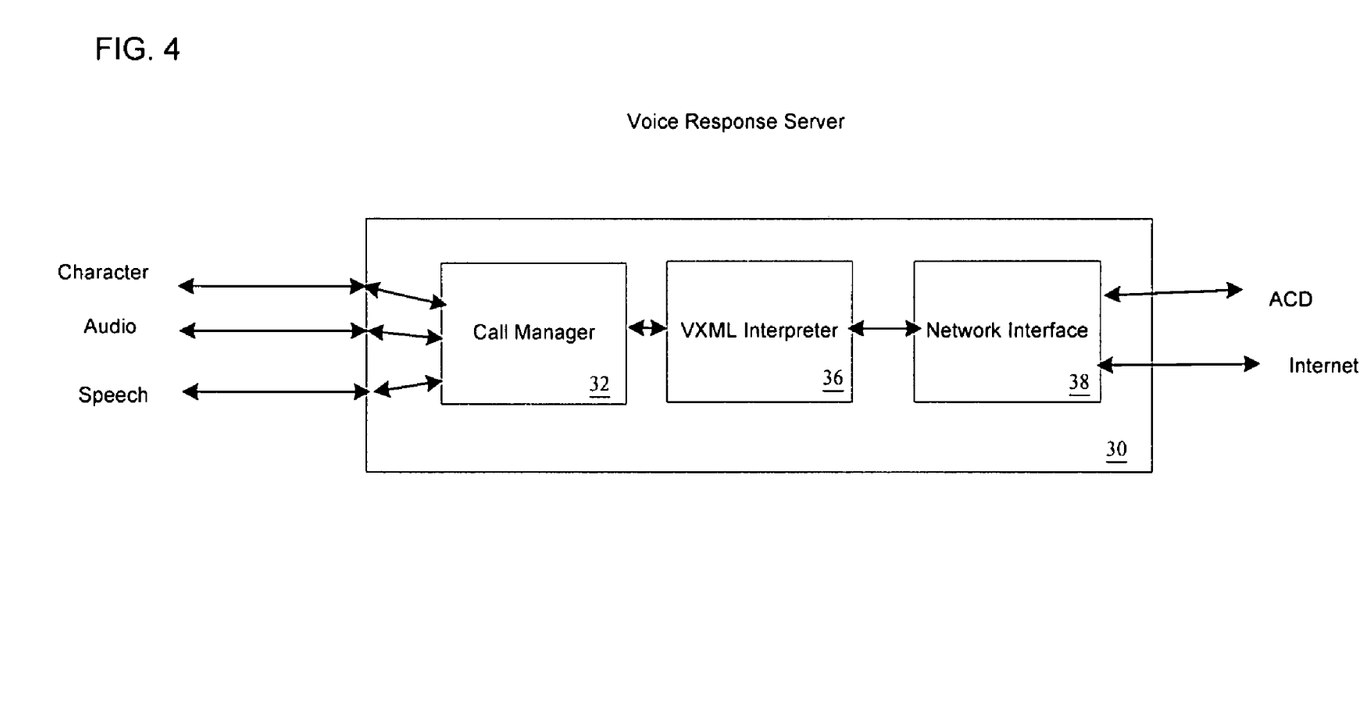
FIG. 4 illustrates a simplified functional block diagram of a voice response server of a call center.

In the exemplary embodiment in FIG. 4, the VXML interpreter 36 functions to translate information between an administrator (14 or 16) and the ACD 9 or 3CS server 8. Specifically, the VXML interpreter 36 interfaces to the call manager 32 and network interface 38 to translate information between an administrator 14, 16 and the computers in the call center, such as ACD 9 or 3CS server 8. After input processing is performed by the call manager 32, the input command is processed by the VXML interpreter 36 into an ACD or 3CS server command to be executed in the call center. The VXML interpreter 36 implements Voice eXtensible Markup Language (VoiceXML), a specification developed by an industry organization which is a standard for providing Internet services via voice interfaces, such as the telephone. In the above example, the VXML interpreter 36 receives a VoiceXML command to hear the call log and translates the VoiceXML command into to a command which is executed to retrieve the call log from the 3CS server 8.

The network interface 38 functions to manage the transmission and receipt of data between the voice response server 30 and the ACD 9 and 3CS server 8. The network interface 38 receives commands to be executed on the ACD 9 or 3CS server 8 and translates the commands into data packets. Further, network interface 38 receives data packets from ACD 9 or 3CS server 8 and translates the data packet into information for the VXML interpreter 36. If the voice response server 30 is connected to the ACD 9 by an Ethernet connection, then the network interface 38 functions to manage Ethernet data packets. Alternatively, the connection may be any equivalent local area network, wide area network, Intranet, Internet, or extranet connection.

In an exemplary embodiment, a Windows NT 4.0 server utilizing dual Pentium processors with minimum clock speeds of 200 MHz with 128 MB of RAM may be regarded as the type of voice response server 30 contemplated herein. Equivalent processors and equivalent operating systems may also be used. Further, the voice response server 30 includes analog voice ports to support wireless or wireline telephony connections. For example, remote administrator 16 may connect to the voice server 30 by communications devices including a telephone, cell phone, personal digital assistant and laptop computer.

In an exemplary embodiment, the call center 100 includes 3CS computer 8 that functions to provide the voice response server 30 with information from the ACD 9. The 3CS computer 8 provides access to configuration, real time and call control information for the agents, agent groups, call center applications, and ACD 9 objects. For example, the 3CS computer 8 may relay statistics and performance information to the voice response server 30. The 3CS computer 8 also provides administrative features including viewing equipment configurations, reconfiguring equipment attributes, and editing software applications.

Figure 2:
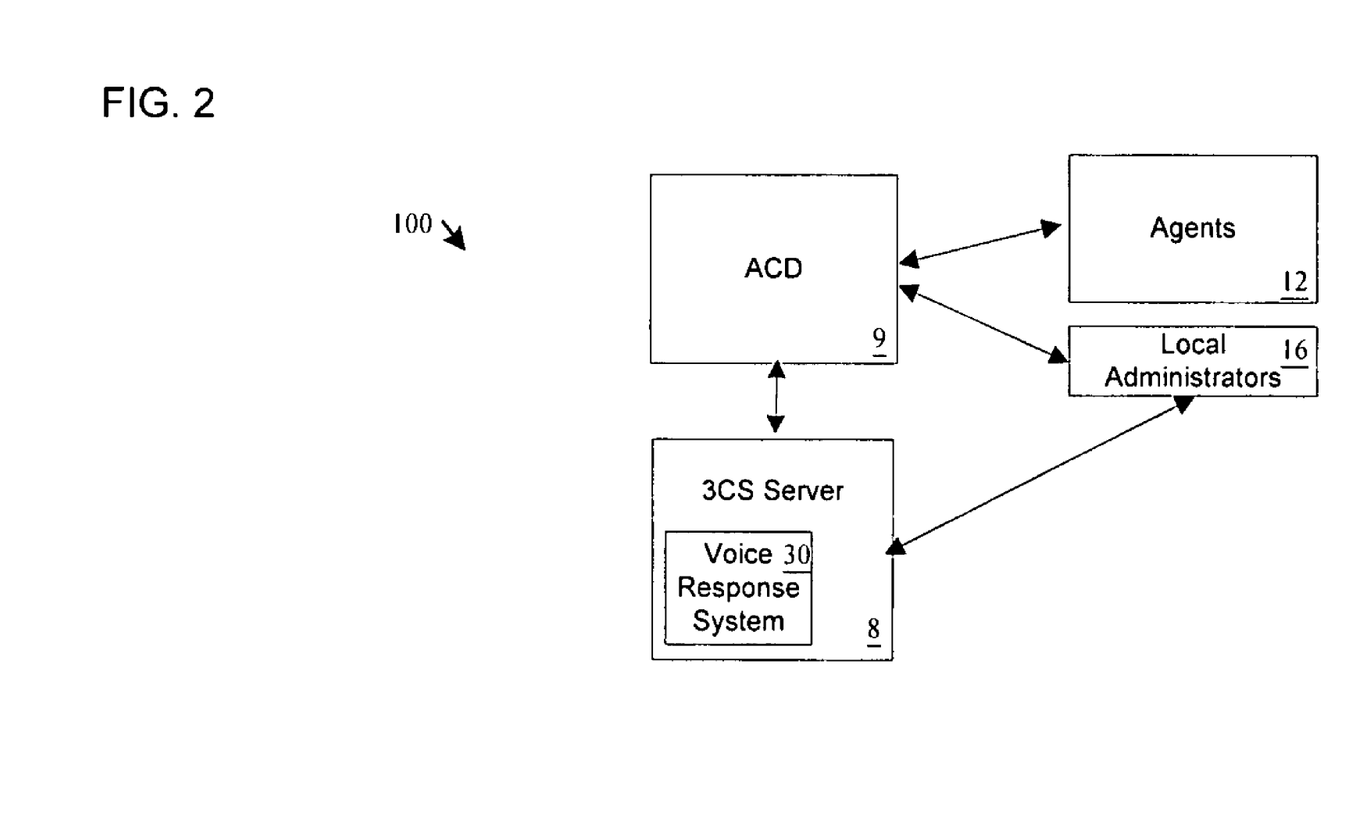
FIG. 2 illustrates a simplified functional block diagram of an alternative embodiment of a call center in accordance with an illustrated embodiment of the invention.
Figure 3:
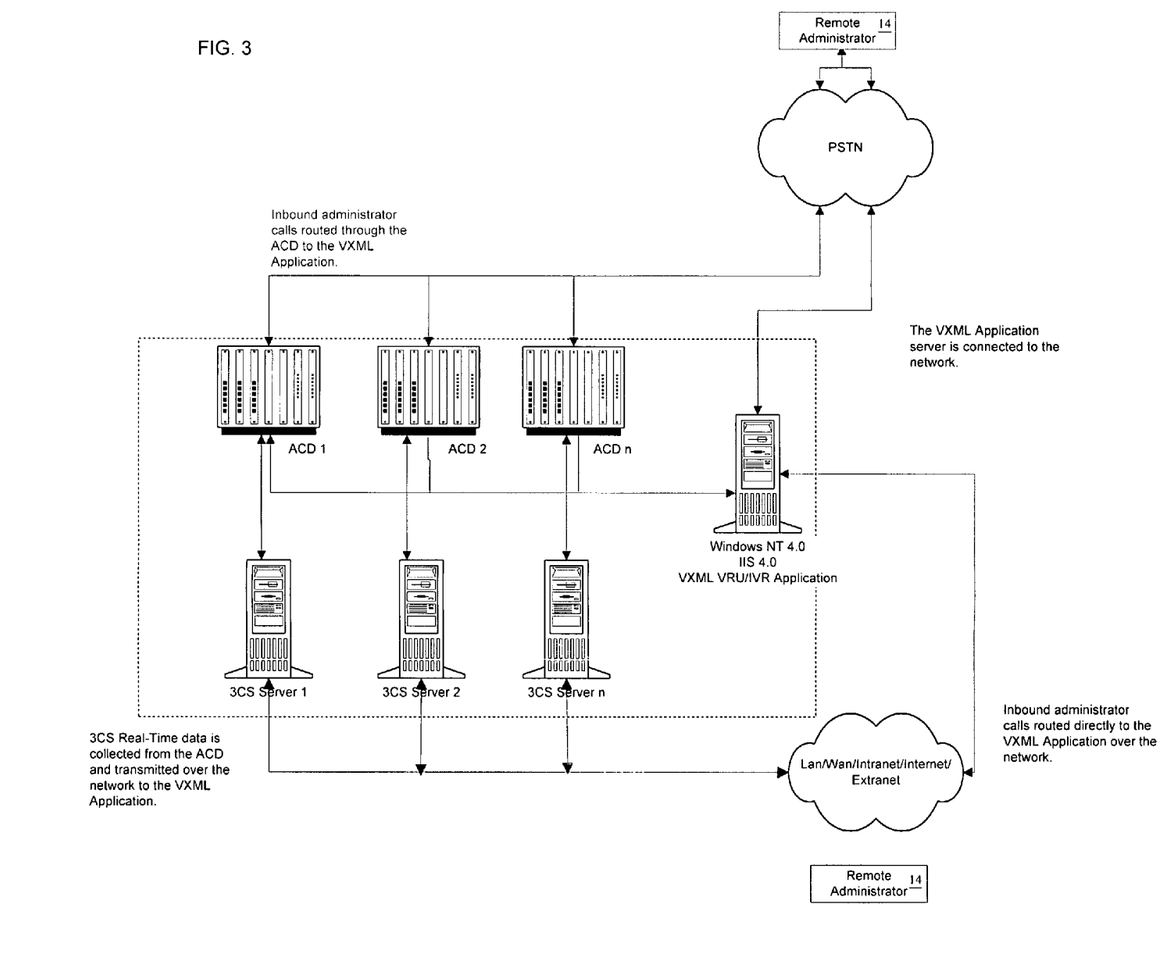
FIG. 3 illustrates a simplified functional block diagram of an exemplary embodiment of a call center in accordance with an illustrated embodiment of the invention.

In an exemplary embodiment, the functionality provided by the voice response server 30 is separate from the 3CS computer 8. However, the functionality may be combined into one computer system as shown in FIG. 2. Further, although the call center described includes one ACD and one 3CS computer 8, the call center may include a plurality of ACDs and a plurality of 3CS computers. For example, a company that requires a number of agents will typically utilize four or five ACDs and 3CS computers in one call center as shown in FIG. 3.

Figure 5:
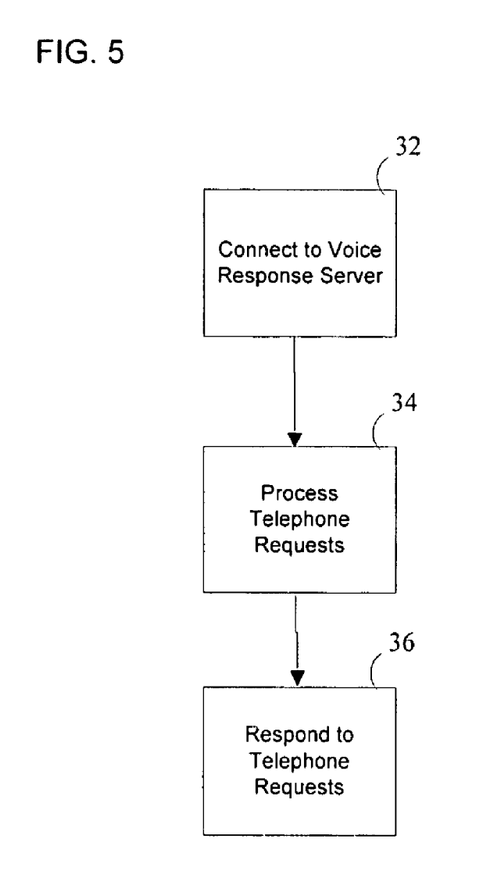
FIG. 5 is a simplified flow diagram of the method used by the system of FIG. 4.

In accordance with an embodiment of the present invention, a method of using a telephone to access information in a call center is provided which includes the steps of: (a) connecting to a voice response server (Block 32), (b) processing telephone requests (Block 34), and (c) responding to telephone requests (Block 36).

The step of connecting (Block 32) functions to interface with either a local or remote administrator 14, 16. The connection process includes verifying that authorized administrators 14, 16 are accessing the call center 100. Checking login names with associated password information may perform verification. If an authorized administrator 14, 16 does not provide an appropriate password, then access will be denied. In an illustrative embodiment of the invention, authentication of administrators 14, 16 may be performed within the voice response server 30.

The step of connecting (Block 32) also includes provide a telephony interface to administrators 14, 16. The telephony interface may accept character, audio, and speech input from administrators 14, 16 to perform connection services and process input received. Further, the step of connecting (Block 32) may also perform text to speech translation and automatic speech recognition processing. The step of connecting further includes the step of accepting character input such as DTML and speech information.

The step of processing (Block 34) functions to translate administrator's 14, 16 input to a requested command and execute the command in the computers in the call center. For example, an administrator 14, 16 may speak a request to hear the number of call center agents. The step of processing (Block 34) accepts the speech command and performs speech recognition on the speech input to translate the request into a command to be executed in the call center computers.

The step of responding (Block 36) functions to give administrators 14, 16 the results of the processing step (Block 34). The step of responding further includes the step of performing text to speech translation to aurally present information to administrators 14, 16. In the example above, the step of responding (Block 36) aurally presents the number of call center agents in the call center to the administrator 14, 16.

In an illustrative embodiment, the method of FIG. 5 adheres to the VoiceXML standard. The results from the step of connecting (Block 32) and results to the step of responding (Block 36) adhere to the VoiceXML standard.

An embodiment of the present invention may employ learning as a method of increasing efficiency in retrieving call center information. The method recognizes and learns overtime a pattern of regularly used access commands. For example, the user regularly accesses the call log. Thus, when the user logs into the call center, the method may automatically present call log information to the user. The ability to predict familiarity and unfamiliarity allows an embodiment of the present invention to be more useful.

Another embodiment of the present invention may allow an experienced user to retrieve information quickly. An experienced user may "barge in" to retrieve information from the call center. Barge in means to interrupt the presentation of requesting information during the connection process to retrieve call center information quickly. For example, the voice response server may present a welcome message, such as "Welcome to call center #5467 in Wooddale, Ill." Before the voice response server finishes presenting the welcome message, the administrator 14, 16 may barge in with a request for message queue information.

A specific embodiment of a system and method of using voice to access information in a call center according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

The invention claimed is:

1. A method of using voice to provide administrative access to call center operational management information in a call center having a plurality of customer service agents to service callers and at least one administrator comprising the steps of:
   providing a computer within the call center with real-time configuration, and call control information for agents and agent groups of the call center;
   connecting a remote administrator responsible for management of the call center via a telephone to the computer through a voice response server, said management of the call center including configuration and monitoring call center entities;
   the voice response server processing voice telephone requests from the administrator requesting operational information from the call center about management of the call center including management of the call center entities; and
   the voice response server responding to the telephone requests by providing the operational information about management of the call center aurally to the administrator via the telephone.

2. The method of claim 1 wherein the step of connecting further comprises the step of interfacing with a telephony server to receive telephony input from a remote administrator and wherein the voice response server uses a VXML interpreter to translate the voice telephone requests of the administrator to call center commands.

3. The method of claim 1 wherein the step of connecting to a voice response server further comprises the step of authenticating the administrator in the voice response server.

4. The method of claim 3 wherein the step of authenticating is performed by matching login names with passwords.

5. The method of claim 1 wherein the step of processing further comprises translating an administrator's input into a command recognized by a computer in the call center.

6. The method of claim 5 wherein the computer includes an automatic call distributor and call center command server.

7. The method of claim 1 wherein the step of processing adheres to the VoiceXML standard and processing further comprises the step of using speech recognition to translate an administrator's input into a command recognized by a computer in the call center.

8. The method of claim 1 wherein the step of responding further comprises the step of performing text to speech translation to aurally present the operational information to administrators.

9. The method of claim 1 wherein the operational information includes at least one of agent schedule, schedule adherence, agent groups, and call center applications.

10. The method of claim 1 wherein the step of processing employs learning a pattern of regularly used access commands of a respective administrator to automatically provide operational information about the call center to the administrator based upon the pattern.

11. The method of claim 1 wherein the step of processing is interrupted by a barge in request to interrupt information presentations to permit quick retrieval of desired information.

12. A system for using voice for administrative access to call center operational management information in a call center having a plurality of customer service agents comprising:
 means within the call center for providing real-time configuration, and call control information for agents and agent groups of the call center,
 means for connecting a remote administrator responsible for management of the call center via a telephone to the means for providing through a voice response server, said management of the call center including management of the plurality of agents,
 means for processing voice telephone requests from the administrator requesting operational information from the call center about management of the call center and information about management of the plurality of agents, and
 means for responding to the telephone requests by providing the operational information about management of the call center aurally to the administrator via the telephone, said means including means for recognizing and learning over time a pattern of regularly used commands of a respective administrator to automatically provide regularly requested information based upon the pattern.

13. The system of claim 12 wherein the means for connecting includes a programmable computer configured to accept telephony requests from the administrator and to translate the requests into a command for operational information recognized by the means for responding.

14. The system of claim 12 wherein the means for processing includes a voice response server comprising a programmable computer which permits a barge in request to interrupt during an information presentation before it can finish to quickly retrieve desired information.

15. The system of claim 12 wherein the means for responding includes a programmable computer.

16. A system for using voice to provide administrative access to operational call center information in a call center having a plurality of customer service agents to service callers comprising:
 a call center computer of the call center containing real-time configuration, and call control information for agents and agent groups of the call center;
 a call manager which accepts information requests by voice from a remote administrator responsible for management of the call center via a telephone, the management of the call center including management of the plurality of agents, and which call manager provides operational information by voice to the administrator via the telephone about the management of the call center in response to the requests;
 a VXML interpreter that translates the operational information and the requests between the administrator and call center computer; and
 a network interface that manages transmission and receipt of data between the VXML interpreter and call center computer including the operational information.

17. The system of claim 16 wherein the call manager is a programmable computer which interfaces to a telephony server to receive telephone input from a remote administrator.

18. The system of claim 17 wherein the call manager further employs learning a pattern of regularly used access commands from a remote administrator.

19. The system of claim 17 wherein the call manager includes a database for authenticating users of the system.

20. The system of claim 17 wherein the call manager recognizes and learns a pattern of regularly used commands of a respective administrator to automatically provide regularly requested operational information.

21. The system of claim 17 wherein the VoiceXML interpreter includes a programmable computer for translating telephony requests to VoiceXML commands.

22. The system of claim 17 wherein the VoiceXML interpreter includes a translator for rendering VoiceXML commands into automatic call distributor commands.

23. The system of claim 17 wherein the call manager interrupts information requesting presentations in response to a barge in request from the administrator.

24. The system of claim 17 wherein the network interface includes local area network, Internet, extranet, and wireless network software.

25. The system of claim 17 wherein the network interface includes a programmable computer for translating VoiceXML commands into data packets for a local area network.

26. The system of claim 17 wherein the network interface includes computer hardware which retrieves data from a local area network and translates the data into VoiceXML commands.

* * * * *